US006272911B1

(12) United States Patent
Hinkle

(10) Patent No.: US 6,272,911 B1
(45) Date of Patent: Aug. 14, 2001

(54) VEHICLE SENSING SYSTEM AND METHOD

(75) Inventor: Joseph A Hinkle, Huntsville, AL (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/471,584

(22) Filed: Dec. 23, 1999

(51) Int. Cl.[7] .................................................. G01M 15/00
(52) U.S. Cl. ........................ 73/118.1; 73/290 R; 73/305; 73/306
(58) Field of Search ........................... 73/290 R, 305, 73/306, 118.1; 340/438, 450.2

(56) References Cited

U.S. PATENT DOCUMENTS

| | | |
|---|---|---|
| 3,623,043 | 11/1971 | Bozoian . |
| 3,681,753 | 8/1972 | Whalen et al. . |
| 3,886,518 | 5/1975 | Bozoian . |
| 3,911,744 | 10/1975 | Edwards . |
| 4,102,191 | 7/1978 | Harris . |
| 4,470,296 * | 9/1984 | Kobayashi et al. ................ 73/113 |
| 4,625,284 | 11/1986 | Suzuki . |
| 4,773,260 * | 9/1988 | Ohno et al. ........................ 73/113 |
| 4,912,646 * | 3/1990 | Cerruti ............................. 73/304 R |
| 4,967,181 | 10/1990 | Lizuka et al. . |
| 4,987,776 * | 1/1991 | Koon ................................ 73/304 C |
| 5,519,397 | 5/1996 | Chapotot et al. . |
| 5,532,673 | 7/1996 | Olson et al. . |
| 5,666,851 * | 9/1997 | Bacon ................................... 73/317 |
| 5,711,355 * | 1/1998 | Kowalczyk . |
| 5,713,401 * | 2/1998 | Weeks . |
| 5,887,616 * | 3/1999 | Ikeda et al. ...................... 73/290 R |

* cited by examiner

Primary Examiner—Eric S. McCall
(74) Attorney, Agent, or Firm—Mark P. Calcaterra

(57) ABSTRACT

A method and apparatus for determining unique fuel amount limit values for a fuel tank of a particular vehicle. The fuel tank has a first fuel amount limit that is associated with a level of fuel in the fuel tank. A fuel varying activity is performed related to the fuel tank of the vehicle so that the level of fuel in the fuel tank is beyond the first fuel amount level. A second fuel amount limit is determined based upon the level of fuel that is beyond the first fuel amount level. A fuel amount indicator display is adjusted based upon the determined second fuel amount.

7 Claims, 8 Drawing Sheets

FIG - 4

Level Sensor Fuel Volume Vs. Resistance

|  | Seg ment # | Float Height (in) | Float Height (mm) | Fuel Height (mm) | Fuel Volume Gallons | Linear Card Ohms | Desired Card Ohms | Ohms Rate of Change | Selected Ohms | Ohms Rate of Change |
|---|---|---|---|---|---|---|---|---|---|---|
| ES |  | 0.00 | -12.87 | -4.07 |  |  |  |  |  |  |
|  | 45 | 0.00 | -7.08 | 1.72 | 0.05 | 1050.0 | 1050.0 | 7.3 | 1050.0 | 7.4 |
|  | 44 | 0.00 | -3.56 | 5.24 | 0.15 | 1027.7 | 1042.7 | 7.4 | 1042.6 | 7.4 |
| ED | 43 | 0.00 | 0.00 | 8.80 | 0.24 | 1005.5 | 1035.3 | 7.4 | 1035.2 | 7.4 |
|  | 42 | 0.00 | 3.58 | 12.38 | 0.34 | 983.2 | 1027.9 | 7.5 | 1027.8 | 7.4 |
|  | 41 | 0.00 | 7.19 | 15.99 | 0.44 | 960.9 | 1020.4 | 16.3 | 1020.4 | 16.4 |
|  | 40 | 0.00 | 10.83 | 19.63 | 0.66 | 938.6 | 1004.0 | 26.9 | 1004.0 | 24.9 |
|  | 39 | 0.00 | 14.48 | 23.28 | 1.02 | 916.4 | 977.1 | 22.9 | 979.1 | 24.9 |
|  | 38 | 0.00 | 18.16 | 26.96 | 1.33 | 894.1 | 954.2 | 25.0 | 954.1 | 24.9 |
|  | 37 | 0.00 | 21.85 | 30.65 | 1.67 | 871.8 | 929.2 | 27.7 | 929.2 | 26.6 |
|  | 36 | 0.00 | 25.56 | 34.36 | 2.04 | 849.5 | 901.5 | 27.7 | 902.7 | 26.6 |
|  | 35 | 0.00 | 29.27 | 38.07 | 2.41 | 827.3 | 873.7 | 24.3 | 876.1 | 26.6 |
|  | 34 | 0.00 | 32.99 | 41.79 | 2.73 | 805.0 | 849.4 | 23.9 | 849.6 | 26.6 |
|  | 33 | 0.00 | 36.72 | 45.52 | 3.05 | 782.7 | 825.6 | 27.9 | 823.0 | 26.6 |
|  | 32 | 0.00 | 40.45 | 49.25 | 3.43 | 760.5 | 797.7 | 27.8 | 796.5 | 26.6 |
|  | 31 | 0.00 | 44.17 | 52.97 | 3.80 | 738.2 | 769.9 | 25.7 | 769.9 | 24.4 |
|  | 30 | 0.00 | 47.89 | 56.69 | 4.41 | 715.9 | 744.2 | 23.2 | 745.5 | 24.4 |
|  | 29 | 0.00 | 51.61 | 60.41 | 4.45 | 693.6 | 721.1 | 26.9 | 721.1 | 27.3 |
|  | 28 | 0.00 | 55.31 | 64.11 | 4.81 | 671.4 | 694.2 | 27.6 | 693.9 | 27.3 |
|  | 27 | 0.00 | 59.00 | 67.80 | 5.18 | 649.1 | 666.6 | 27.5 | 666.6 | 27.3 |
|  | 26 | 0.00 | 62.68 | 71.48 | 5.55 | 626.8 | 639.1 | 27.3 | 639.4 | 27.3 |
|  | 25 | 0.00 | 66.34 | 75.14 | 5.91 | 604.5 | 611.8 | 27.1 | 612.1 | 27.3 |
|  | 24 | 0.00 | 69.97 | 78.77 | 6.28 | 582.3 | 584.6 | 27.0 | 584.9 | 27.3 |
|  | 23 | 0.00 | 73.59 | 82.39 | 6.64 | 560.0 | 557.6 | 26.7 | 557.6 | 24.9 |
|  | 22 | 0.00 | 77.17 | 85.97 | 7.00 | 537.7 | 530.8 | 24.2 | 532.7 | 24.9 |
|  | 21 | 0.00 | 80.73 | 89.53 | 7.32 | 515.5 | 506.6 | 23.9 | 507.7 | 24.9 |
|  | 20 | 0.00 | 84.25 | 93.05 | 7.64 | 493.2 | 482.7 | 23.6 | 482.8 | 24.9 |
|  | 19 | 0.00 | 87.73 | 96.53 | 7.96 | 470.9 | 459.1 | 25.5 | 457.8 | 24.9 |
|  | 18 | 0.00 | 91.18 | 99.98 | 8.30 | 448.6 | 433.7 | 25.5 | 432.9 | 24.9 |
|  | 17 | 0.00 | 94.59 | 103.39 | 8.64 | 426.4 | 408.2 | 25.2 | 407.9 | 24.9 |
|  | 16 | 0.00 | 97.96 | 106.76 | 8.98 | 404.1 | 383.0 | 20.9 | 383.0 | 21.2 |
|  | 15 | 0.00 | 101.27 | 110.07 | 9.26 | 381.8 | 362.1 | 21.4 | 361.9 | 21.2 |
|  | 14 | 0.00 | 104.54 | 113.34 | 9.54 | 359.5 | 340.7 | 30.1 | 340.7 | 24.6 |
|  | 13 | 0.00 | 107.76 | 116.56 | 9.95 | 337.3 | 310.6 | 24.5 | 316.1 | 24.6 |
|  | 12 | 0.00 | 110.93 | 119.73 | 10.27 | 315.0 | 286.1 | 23.2 | 291.5 | 24.6 |
|  | 11 | 0.00 | 114.04 | 122.84 | 10.58 | 292.7 | 262.9 | 22.8 | 266.9 | 24.6 |
|  | 10 | 0.00 | 117.09 | 125.89 | 10.89 | 270.5 | 240.1 | 22.3 | 242.3 | 24.6 |
|  | 9 | 0.00 | 120.08 | 128.88 | 11.19 | 248.2 | 217.7 | 21.9 | 217.7 | 21.2 |
|  | 8 | 0.00 | 123.01 | 131.81 | 11.48 | 225.9 | 195.9 | 21.4 | 196.5 | 21.2 |
|  | 7 | 0.00 | 125.87 | 134.67 | 11.77 | 203.6 | 174.5 | 20.3 | 175.4 | 21.2 |
|  | 6 | 0.00 | 128.66 | 137.46 | 12.04 | 181.4 | 154.2 | 17.0 | 154.2 | 16.8 |
|  | 5 | 0.00 | 131.39 | 140.19 | 12.27 | 159.1 | 137.2 | 16.5 | 137.4 | 16.8 |
|  | 4 | 0.00 | 134.04 | 142.84 | 12.49 | 136.8 | 120.7 | 19.1 | 120.5 | 16.8 |
|  | 3 | 0.00 | 136.62 | 145.42 | 12.74 | 114.5 | 101.7 | 19.3 | 103.7 | 16.8 |
| FD | 2 | 0.00 | 139.20 | 148.00 | 13.00 | 92.3 | 82.4 | 12.4 | 86.8 | 16.8 |
|  | 1 | 0.00 | 141.52 | 150.32 | 13.17 | 70.0 | 70.0 |  | 70.0 |  |
| FS |  | 0.00 | 144.00 | 152.80 |  |  |  |  |  |  |

VEHICLE SENSING SYSTEM AND METHOD

BACKGROUND OF THE INVENTION

1. Field of the Invention

The present invention relates generally to a vehicle fuel sensing system. More particularly, the present invention relates to a computer-based adaptive fuel sensing system.

2. Discussion of the Related Art

Fuel level sensing for vehicles is critical for the safe operation of a vehicle. A fuel level sensing system must indicate to the vehicle's operators that a fuel tank is approaching empty when indeed the fuel tank is approaching empty. This warning indication alerts the vehicle operator that the vehicle should soon be refueled. Correspondingly, vehicle manufacturers mandate that the fuel gauge in a vehicle's console indicates that the fuel level is full when the fuel tank is full.

Previous fuel level sensing approaches have used a float assembly within the vehicle's fuel tank. The level of the float approximates the level of the vehicle's fuel. These approaches have used a predetermined linear relationship for interrelating fuel level with the float's level.

However, the geometric configuration of fuel tanks differ even within the same vehicle model and significantly affect the linear relationship between fuel level and float level. Such differences arise from inconsistencies that invariably creep into the manufacturing of a large number of fuel tanks for a particular model. Fuel components and other objects within a fuel tank also affect the rise and fall of the float within the fuel tank. Due to these components in the fuel tank and the aforementioned fact that geometric configurations of a fuel tank differ, the float may rise and fall more quickly at different points in the fuel tank. This adversely affects the assumed linear relationship between the float's level and the fuel's level.

Accordingly, vehicle manufacturers' typically place a "safe" factor in the predetermined linear relationship. The "safe" factor exhibits a non-limiting disadvantage in that the built-in "safe" factor overcompensates for the fuel level. For example, the "safe" factor makes the fuel gauge show an empty level despite a significant amount of fuel actually remaining. This has led people to believe that their vehicles may be driven for a greater amount of distance although their fuel gauge indicates an empty level.

SUMMARY OF THE INVENTION

The present invention overcomes the aforementioned disadvantage as well as other disadvantages. In accordance with the teachings of the present invention, a fuel card is used for detecting the amount of fuel within a fuel tank of a vehicle. The fuel tank has a fuel level indicator for sensing level of fuel within the fuel tank. The card includes a substrate and resistive material that is disposed on the substrate and in connection with the fuel level indicator. The resistive material is correlated in a non-linear manner with respect to the sensed level of fuel by the fuel level indicator in order to determine the amount of fuel based upon the sensed level. A computer-based module adapts the fuel tank's full and empty levels for each vehicle build during operation or fuel fill-ups of the vehicle.

In one embodiment, the present invention determines unique fuel amount limit values for a fuel tank of a particular vehicle. The fuel tank has a first fuel amount limit that is associated with a level of fuel in the fuel tank. A fuel varying activity is performed related to the fuel tank of the vehicle so that the level of fuel in the fuel tank is beyond the first fuel amount level. A second fuel amount limit is determined based upon the level of fuel that is beyond the first fuel amount level. A fuel amount indicator display is adjusted based upon the determined second fuel amount.

Further objects, features and advantages of the invention will become apparent from a consideration of the following description and the appended claims when taken in connection with the accompanying drawings.

BRIEF DESCRIPTION OF THE DRAWINGS

FIG. 4 is a table depicting a second non-limiting example of the non-linear relationship used by the fuel sender card for correlating fuel volume with fuel height;

DETAILED DESCRIPTION OF THE PREFERRED EMBODIMENT

Figure 1:
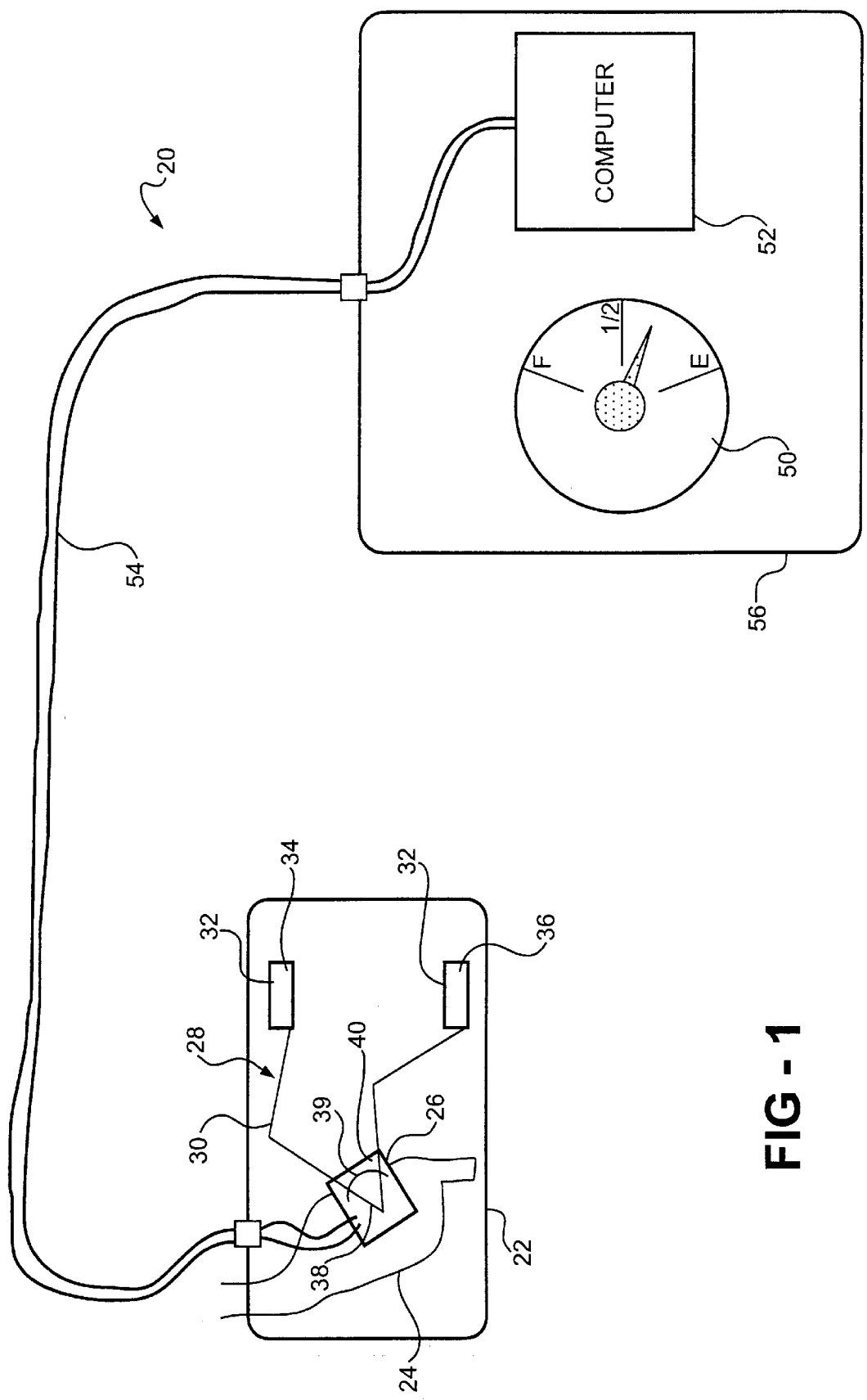
FIG. 1 is a schematic diagram depicting the physical arrangement of the fuel sender card, instrument cluster and microprocessor of the present invention.

As shown in FIG. 1, the present invention is directed to a computer-based adaptive fuel sensing system 20. Fuel tank 22 includes a fuel pump 24, fuel sender card 26, and a fuel float assembly 28. Fuel pump 24 pumps fuel from fuel tank 22 to the engine of the vehicle so that the vehicle may be operated. Fuel float assembly 28 includes a float 32 attached via a wire frame 30 to fuel sender card 26.

Float 32 moves up and down in fuel tank 22 depending upon the level of fuel in the fuel tank. At position 34, float 32 is at the top position within the fuel tank. This position indicates that fuel tank 22 is full with fuel. At position 36, float 32 is at the bottom position within the fuel tank. This position indicates that fuel tank 22 contains little or no fuel.

As float 32 moves up and down within fuel tank 22 due to fuel consumption and sloshing movement of the fuel, wiper 38 on fuel sender card 26 moves along resistive material 39 on card 26. The result is that a different resistance is used for different float positions. In the preferred embodiment, the resistive material is deposited in the form of an arc on substrate 40. The resistance exhibited by the resistive material is correlated in a non-linear manner with the level of float 32. Since the level of float 32 is indicative of volume of fuel in the tank, it follows that the volume of fuel is likewise correlated to the resistive material in a non-linear fashion.

As the level of float 32 varies due to fuel consumption and the fuel's sloshing movement, wiper 38 contacts the resistive material at different positions. Fuel amount is determined based upon the contacted positions on the resistive material. The fuel amount is sent to the vehicle's fuel gauge 50 in order to display the fuel amount. Fuel gauge 50 (i.e., a fuel amount indicator display) is typically placed in the vehicle's instrument cluster 56 for viewing by the vehicle's occupants. However, the present invention is not limited to only displaying the fuel amount to the vehicle's occupants but also includes sending the fuel amount to the vehicle's computerized engine control unit. In this manner, a vehicle technician may access the fuel amount via the control unit in order to, for example, perform fuel consumption diagnostics on the vehicle. Furthermore, fuel gauge 50 may display the fuel amount in gallons or liters or some other fuel amount unit, as well as display the fuel amount via an analog or digital fuel gauge.

In the preferred embodiment, microprocessor 52 receives the fuel amount from fuel sender card 26 via electrical wire connector 54 and controls fuel gauge 50 so that the fuel amount is displayed accurately in instrument cluster 56. Microprocessor 54 is preferably a sixteen bit Motorola HC 11 microprocessor.

Figure 2:
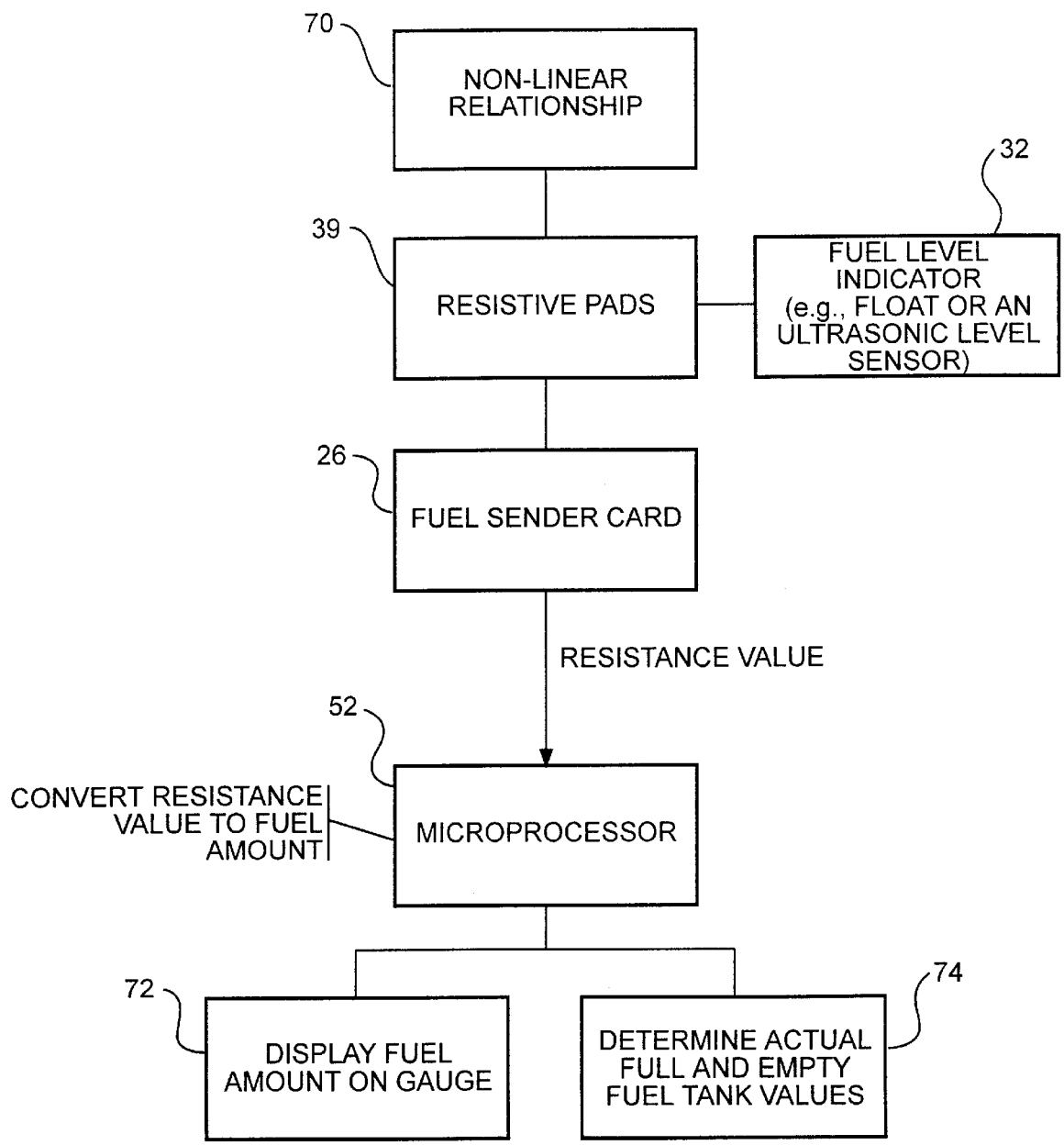
FIG. 2 is a block diagram depicting the components of the present invention used to determine fuel amounts in accordance with the present invention.

FIG. 2 depicts a block diagram of the preferred system of the present invention. Fuel level indicator 32 (e.g., a float assembly) causes certain resistive pads to be contacted. Using the non-linear relationship 70 to determine fuel amount based upon the contacted resistive pads, fuel sender card sends the fuel amount to microprocessor 52. In the preferred embodiment, fuel sender card 26 sends a resistance value to indicate the fuel amount range between full and empty. Microprocessor 52 converts the resistance value to a fuel amount value and uses process 72 to display this value properly via the fuel gauge.

In the preferred embodiment, the present invention converts the resistance value to a value inclusively between 0–255 where the 0 value represents either an empty or full fuel amount depending upon the choice of implementation. Whatever, the choice for the 0 value, the 255 value represents the other fuel limit (i.e., either full or empty). However, it should be understood that the present invention is not limited to a range of 0–255, but includes a fuel amount values suitable for the application at hand.

Using fuel amount values from fuel sender card 26 acquired over time, microprocessor 52 additionally performs via process 74 a determination of the more realistic full and empty resistance values associated with the resistance material. Process 74 keeps track of time varying empty and full values, obtained from the fuel sender card and uses these learned limits to establish unique full and empty positions for the vehicle in which the microprocessor has been placed. Since resistance varies per change in fuel value, process 74 uses the resistance values between these two points to display fuel quantity on the fuel gauge. This novel approach reduces the size of the "fuel buffer" that is used as a fuel "safety" factor overcompensation.

Figure 3:
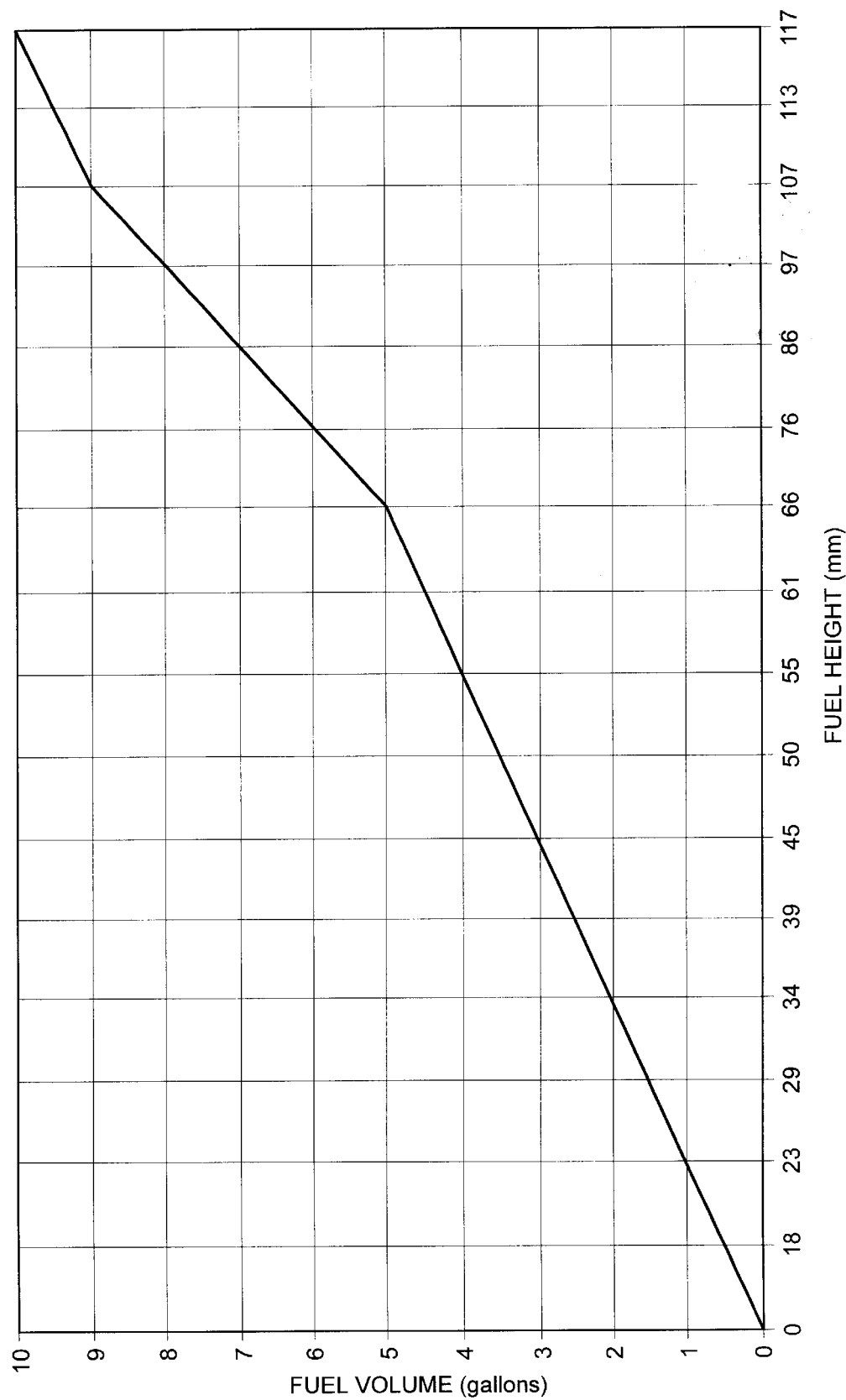
FIG. 3 is an x-y graph depicts a non-limiting example of a non-linear relationship used by the fuel sender card for correlating fuel volume with fuel height.

FIG. 3 depicts a non-limiting example of a non-linear relationship used by the fuel card to determine fuel volume from fuel height of a float. Fuel height is the abscissa axis expressed in millimeters, and fuel volume is the ordinate axis expressed in gallons. As shown in this first example, a linear relationship exists between fuel height and fuel volume until the fuel height reaches a value of 66 mm. At this point, the relationship changes until it reaches a fuel height value of 107 mm. At this point, the relationship changes once more. These step-wise changes in relationships are a more realistic portrayal of the actual relationship between fuel height and fuel volume.

FIG. 4 depicts in a tabular manner a second example of the non-linear relationship used by the fuel sender card for a particular fuel tank. The "Segment" column depicts a resistive pad segment number of the fuel card. In the preferred embodiment, 45 pads are used, but it should be understood that the present invention is not limited to this number of pads, but includes utilizing a number of pads that is suitable for the level of specificity required for the application at hand.

The "Fuel Height (mm)" column represents the height of the float in the fuel tank relative to a predetermined reference point in the fuel tank. The "Fuel Volume (gallons)" column represents the fuel volume in the tank. Preferably, a vendor that is responsible for manufacturing the fuel tank performs fuel tank volumetric studies in order to correlate actual fuel volume with fuel height. The resistance for each pad is adjusted to reflect this correlation. The "Selected Ohms" column represents the resistance values for each pad that most practically interrelate fuel volume with fuel height.

Due to the actual design of the tank, the selected resistance values exhibit a non-linear relationship between the fuel volume and the fuel height. The "Ohms Rate of Change" column depicts the non-uniform rate of change. For example, the rate of change for pads 42 to 45 is 7.4, while the rate of change for pad 41 is 16.4 and the rate of change for pads 38 to 40 is 24.9.

Figure 5:
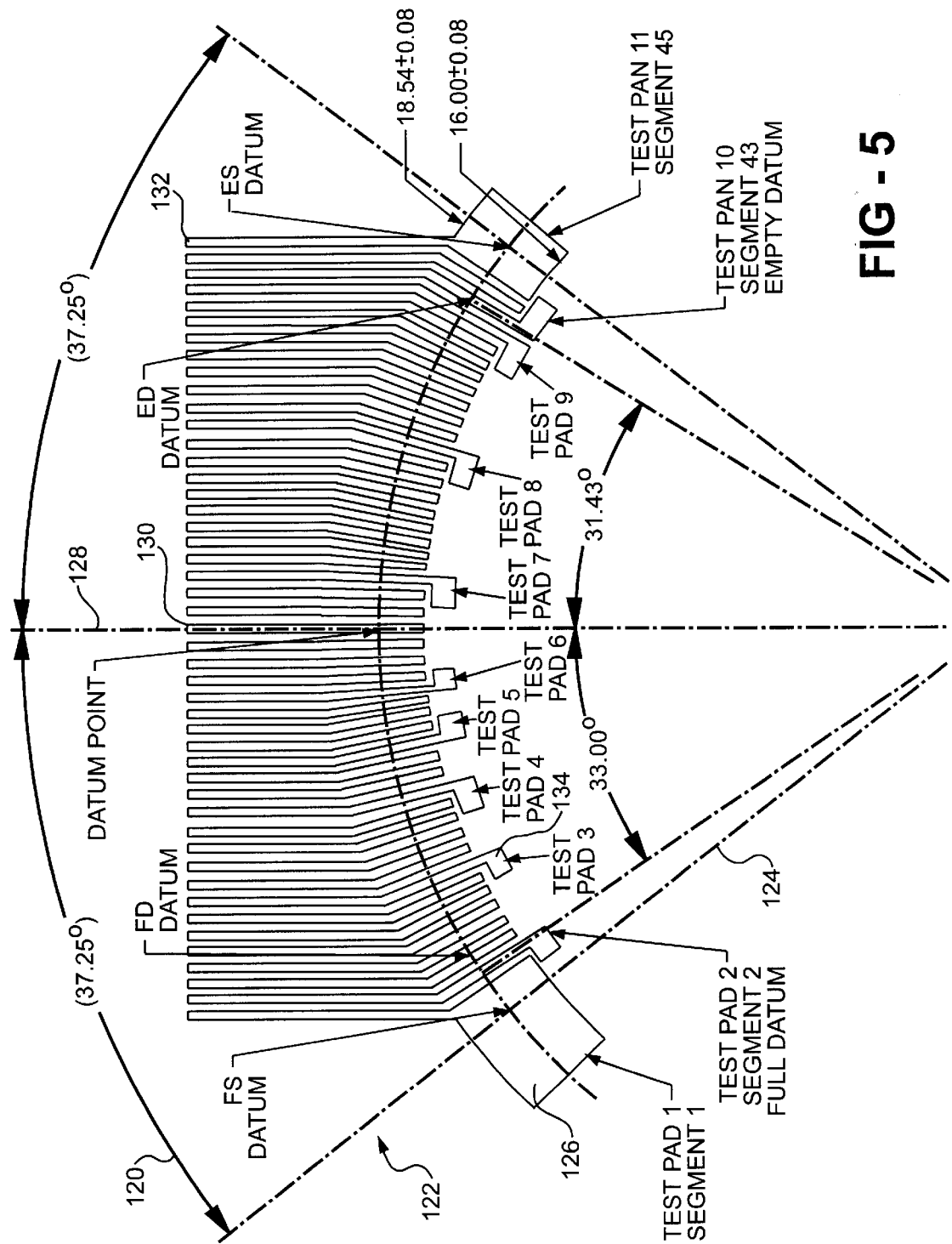
FIG. 5 depicts the preferred embodiment of the fuel sender card's resistive pads.

FIG. 5 depicts the preferred embodiment of the fuel sender card's resistive pads. Arc 120 depicts the full range of sweep of the wiper across pads 122. A wiper is shown in three exemplary positions: wiper position 124 depicts the wiper contacting first pad 126; wiper position 128 depicts the wiper contacting the middle pad 130; and wiper position 132 contacting the 45th pad 132. Test pads (e.g., test pad 134) are used to validate the resistance values in a quality checking process that is preferably performed at the card manufacturers site.

Each pad is given a particular resistive value in order to reflect the non-linear relationship between fuel volume and fuel height. In the preferred embodiment, pad number 43 is aligned with the float at the designed minimum float height, and pad number 3 is aligned with the float at the designed maximum float height.

Figure 6:
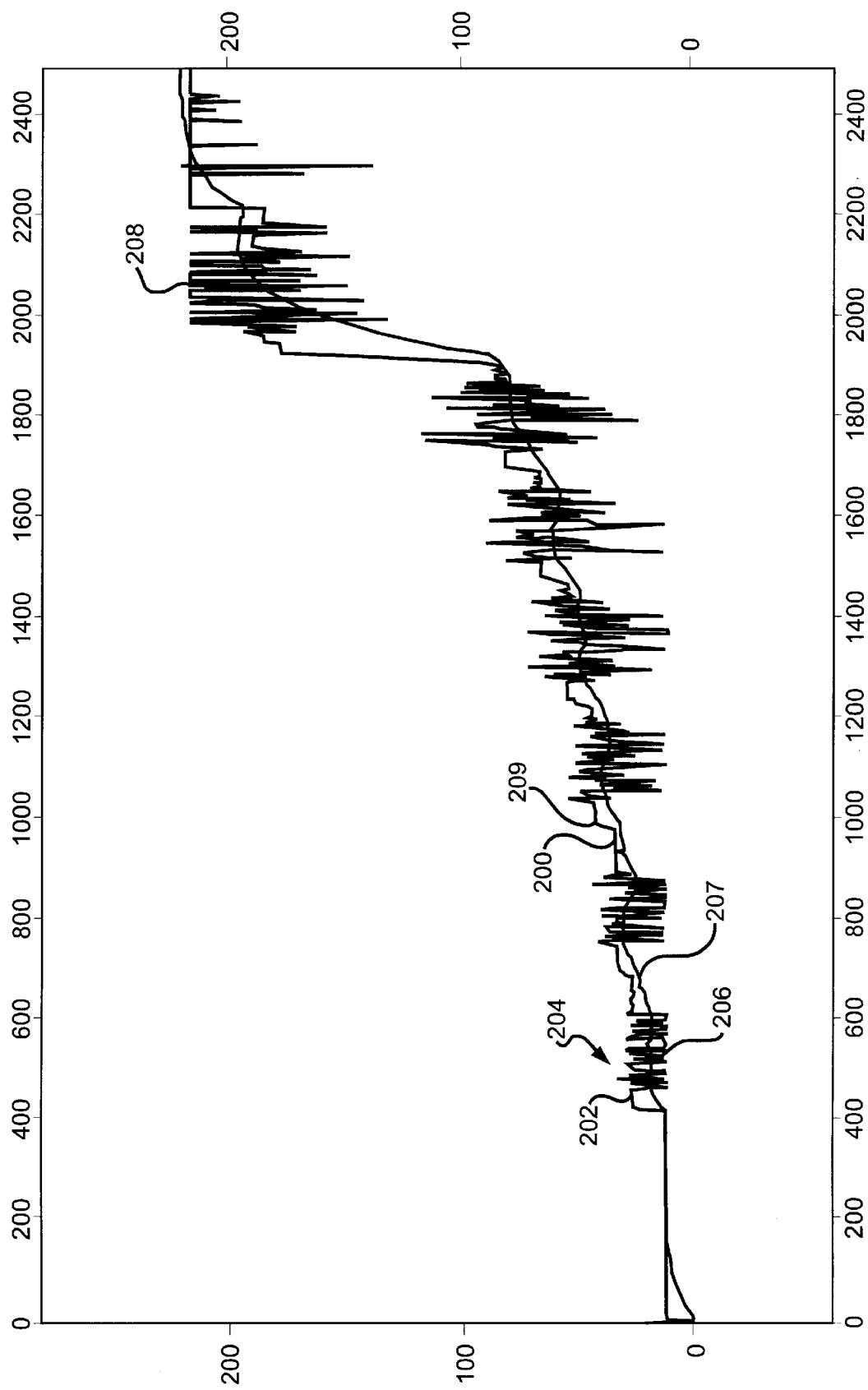
FIG. 6 is an x-y graph depicting the determination of the actual full and empty fuel amount values of a vehicle.

FIG. 6 graphically depicts how the present invention determines the actual full and empty fuel amount values of the car. The abscissa axis represents operational time of the car (expressed in seconds) and the ordinate axis represents fuel amount in the range from 0 to 255. Curve 207 represents a fuel averaging value of the fuel amount at a particular point in time. The car was operated for a certain period of time whereupon fuel was added to the car, such as at point 209 on the graph of FIG. 6.

The present invention uses a fuel varying activity of the vehicle to determine actual full and empty fuel tank values. The present invention's software in the microprocessor monitors the fuel sender card's resistance and under certain conditions to adjust the empty resistance and full resistance values. This results in a fuel system calibration that is unique to each vehicle build.

In non-turbulent fuel varying operation of the vehicle, the float usually does not reach the actual bottom of the fuel tank. However during an operation of the vehicle that results in a turbulent condition in the fuel tank, the float may reach the actual bottom of the fuel tank if the fuel tank is approaching empty. A turbulent condition in the fuel tank typically arises: when the vehicle is turned sharply at a sufficient speed (e.g., above ten miles per hour); when the vehicle is operated on a non-smooth (i.e., bumpy) road; or when the vehicle undergoes acceleration or deceleration.

A similar approach may be used to determine the actual top of the fuel tank during turbulent conditions. However, the preferred embodiment senses the uppermost fuel height during fuel fill-ups and uses this new height to adjust if required the new full level. A new height is not used if it does not supercede the current full fuel height value. In the preferred embodiment, a new height is used if that new height has been reached on two different situations and if that new height supercedes the current full fuel height value.

For example on the graph, curve 200 at position 202 represents the fuel height of a vehicle in a non-turbulent state. The rapid fluctuations of curve 200 in region 204 represents the fuel height of the vehicle in a turbulent state. During this turbulent state, the actual lowest fuel height is encountered since the float is rapidly moving up and down in the bottom region of the tank. For example, position 206 depicts the float at its actual lowest level.

Similarly, when the fuel tank is in a relatively full condition and is in a turbulent state, then the float is rapidly moving up and down in the upper region of the tank. For example, position 208 depicts the float at its actual highest height in the tank.

After approximately the first ten fuel fill-ups, the present invention learns the actual full point and resets the gauge needle position. This prevents the gauge needle from being "stuck" at the full position due to overfills. The present invention learns the lowest point when the tank is relatively empty and in a sufficiently turbulent state.

Figure 7:
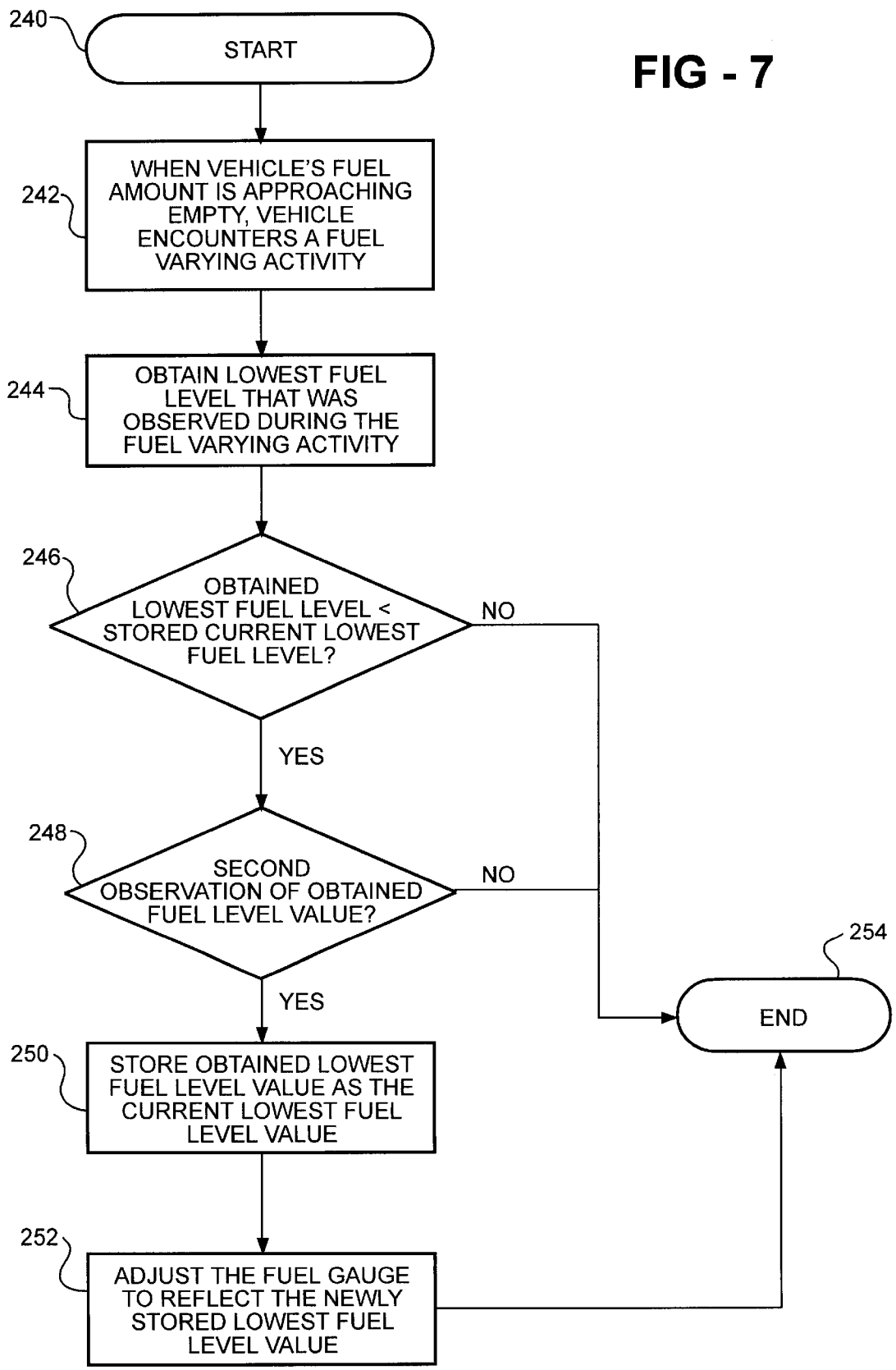
FIG. 7 is a flow chart depicting the steps associated with the present invention determining a lowest fuel level.

FIG. 7 is a flow chart depicting the steps associated with the present invention determining a lowest fuel level. Start indication block 240 indicates that process 242 is performed. Process 242 indicates that a vehicle is undergoing a fuel varying activity and that preferably a vehicle's fuel amount is approaching empty. It should be understood that the present invention is not limited to determining lowest fuel levels only when the fuel tank is approaching empty, but also includes any fuel level in the fuel tank that will reach a new lower limit due to a fuel varying activity.

Process 244 obtains the lowest fuel level that was observed by the present invention during the fuel varying activity. If decision block 246 determines that this newly obtained lowest fuel level is not less than the stored official current lowest fuel level, then processing completes at end block 254. However, if decision block 246 determines that this newly obtained lowest fuel level is less than the stored current fuel level, then processing continues at decision block 248.

If decision block 248 determines that this is the first observation of this lowest fuel level, then this lowest fuel level is stored by the present invention, but not as the current official lowest fuel level; processing completes at end block 254.

If decision block 248 determines that this is the second observation of this lowest fuel level, then this lowest fuel level is stored by the present invention at process 250 as the official current lowest fuel level. Process 252 adjusts the fuel gauge to reflect the newly stored official lowest fuel level value. Processing terminates as end block 254.

Figure 8:
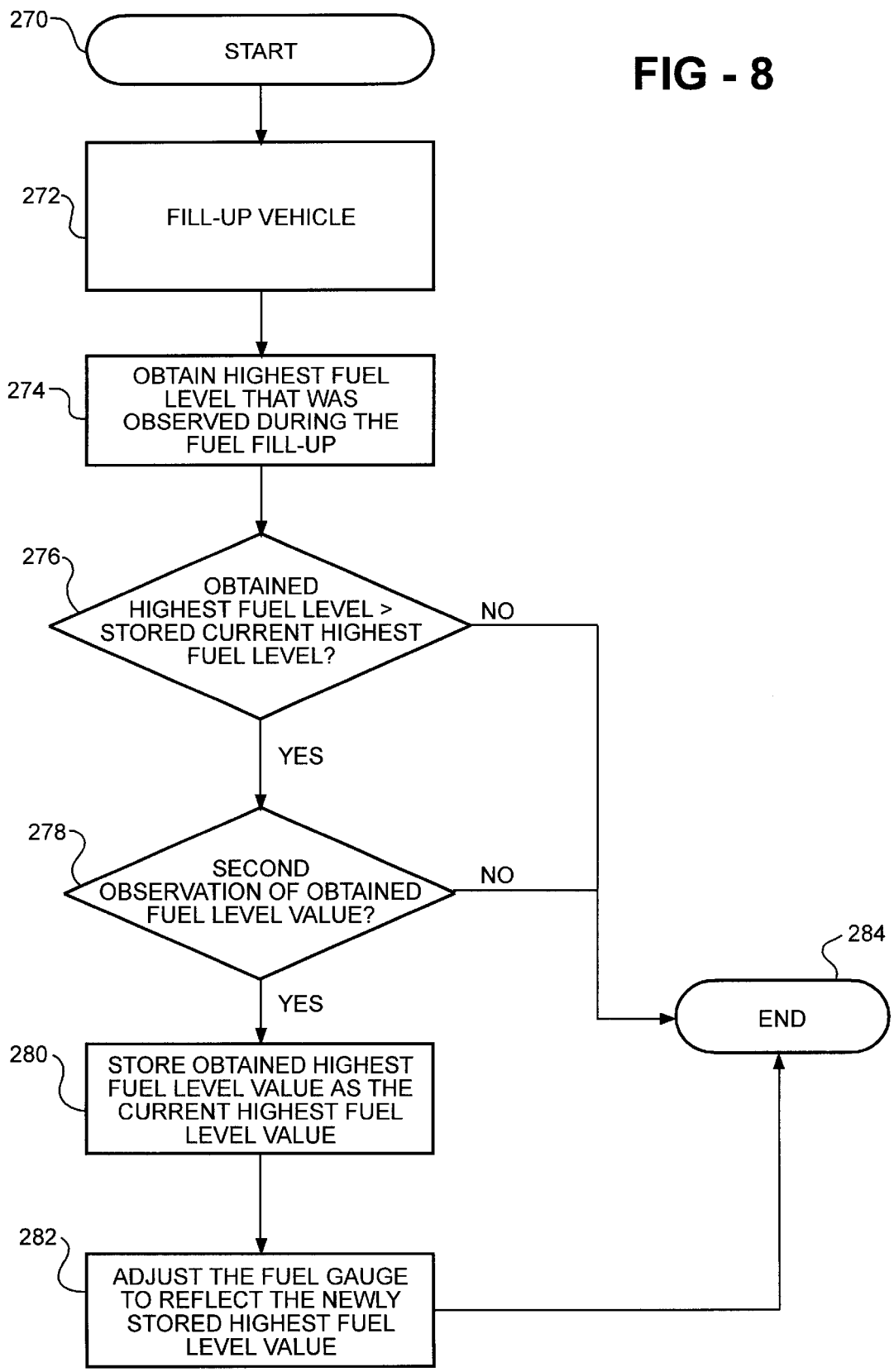
FIG. 8 is a flow chart depicting the steps associated with the present invention determining a highest fuel level.

FIG. 8 is a flow chart depicting the steps associated with the present invention determining a new highest fuel level. Start indication block 270 indicates that process 272 is performed wherein a vehicle is undergoing a fill-up of fuel. Process 274 obtains the highest fuel level that was observed during the fill-up.

If decision block 276 determines that this newly obtained highest fuel level is not greater than the stored current fuel highest level, then processing completes at end block 284. However, if decision block 276 determines that this newly obtained highest fuel level is greater than the stored current highest fuel level, then processing continues at decision block 278.

If decision block 278 determines that this is the first observation of this highest fuel level, then this highest fuel level is stored by the present invention, but not as the current official highest fuel level; processing completes at end block 284.

If decision block 278 determines that this is the second observation of this highest fuel level, then this highest fuel level is stored by the present invention at process 280 as the official current highest fuel level. Process 282 adjusts the fuel gauge to reflect the newly stored official highest fuel level value. Processing terminates as end block 284.

It is to be understood that the invention is not limited to the exact construction illustrated and described above, but that various changes and modifications may be made without departing from the spirit and scope of the invention as defined in the following claims.

What is claimed is:

1. A method for calibrating a fuel level display for a fuel tank in a motor vehicle, the fuel level display operable to display the amount of fuel in the fuel tank in relation to at least one fuel amount display limit, comprising the steps of:

providing a fuel sensing device for determining the amount of fuel in the fuel tank of the motor vehicle;

detecting a fuel varying activity related to the fuel tank of the vehicle such that the amount of fuel in the fuel tank is beyond the at least one fuel amount display limit, wherein the fuel varying activity is an activity selected from the group consisting of acceleration of the vehicle, deceleration of the vehicle, turning of the vehicle, operation of the vehicle on a non-smooth surface, and combinations thereof; and setting the one fuel amount display limit to correspond to the amount of fuel in the fuel tank during the fuel varying activity, thereby calibrating the fuel level display.

2. The method of claim 1 wherein the fuel varying activity is decreasing the amount of fuel in the fuel tank such that the amount of fuel in the fuel tank is less than the at least one fuel amount display limit and the fuel amount display is indicative of an empty fuel tank.

3. A method for calibrating a fuel level display for a fuel tank in a motor vehicle, the fuel level display operable to display the amount of fuel in the fuel tank in relation to at least one fuel amount display limit, comprising the steps of:

providing a fuel sensing device for determining the amount of fuel in the fuel tank of the motor vehicle;

detecting a first fuel varying activity related to the fuel tank of the vehicle such that the amount of fuel in the fuel tank is beyond the at least one fuel amount display limit;

determining an adjusted fuel amount display limit that corresponds to the amount of fuel in the fuel tank during the first fuel varying activity;

detecting a second fuel varying activity related to the fuel tank of the vehicle such that the amount of fuel in the fuel tank is beyond the at least one fuel amount display limit;

determining that the adjusted fuel amount display limit had been reached during the second fuel varying activity; and setting the one fuel amount display limit to correspond to the adjusted fuel amount display limit, thereby calibrating the fuel level display.

4. The method of claim 3 wherein the first fuel varying activity is further defined as filling up the fuel tank with fuel such that the amount of fuel in the fuel tank is greater than the at least one fuel amount display limit and the fuel amount display is indicative of a full fuel tank.

5. The method of claim 3 wherein the first fuel varying activity is an activity selected from the group consisting of acceleration of the vehicle, deceleration of the vehicle, turning of the vehicle, operation of the vehicle on a non-smooth surface, and combinations thereof.

6. The method of claim 3 wherein the first fuel varying activity is further defined as decreasing the amount of fuel in the fuel tank such that the amount of fuel in the fuel tank is less than the at least one fuel amount display limit and the fuel amount display is indicative of an empty fuel tank.

7. The method of claim 3 wherein the step of detecting a first fuel varying activity further comprises the steps of using a float to determine the amount of the fuel in the fuel tank, such that the float reaches a boundary of the fuel tank during the fuel varying activity; and the step of determining an adjusted fuel display limit corresponds to the float reaching the boundary of the fuel tank.

* * * * *